Nov. 3, 1964    S. SEGRE AMAR ETAL    3,154,884
DEVICE FOR FACILITATING SOWING AND PROTECTING
PLANTS REARED FROM THE SEEDS
Filed Aug. 8, 1961    2 Sheets-Sheet 1
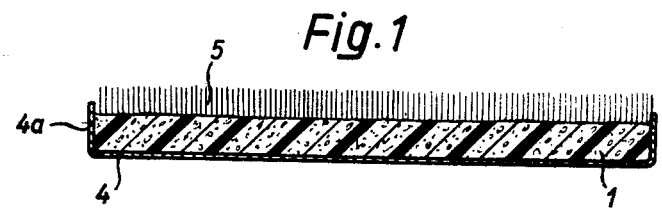
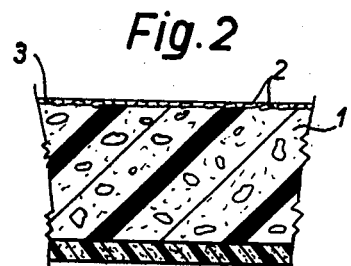
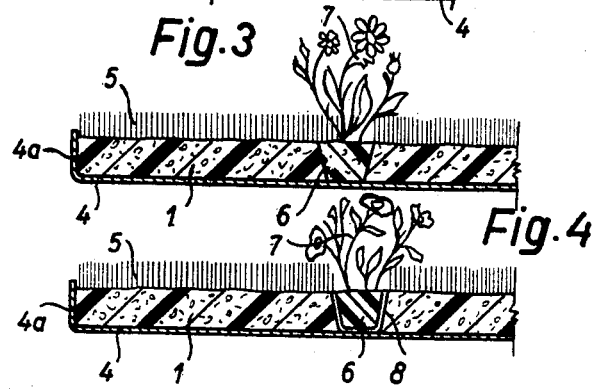
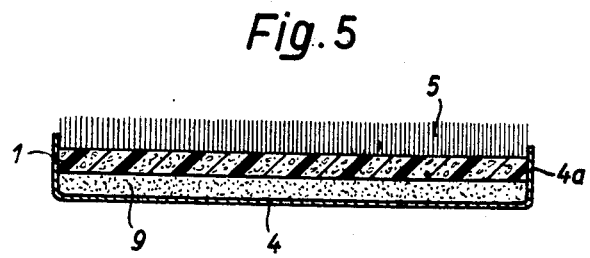
INVENTORS
SION SEGRE AMAR
GUIDO SASSO
BY 
ATTORNEY

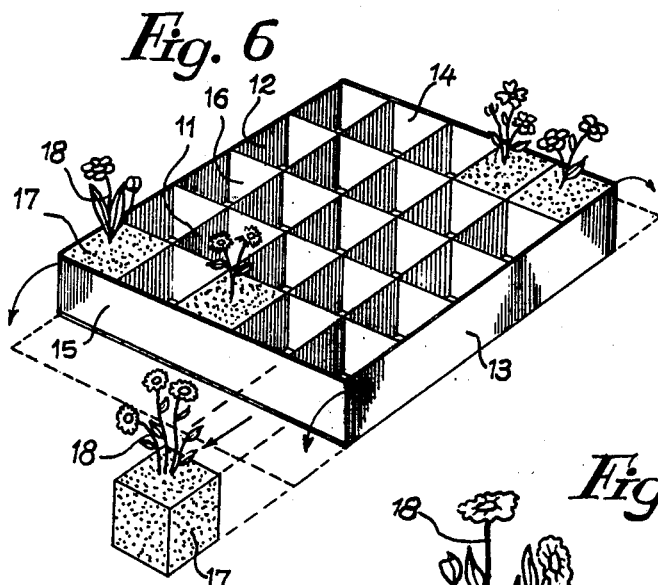
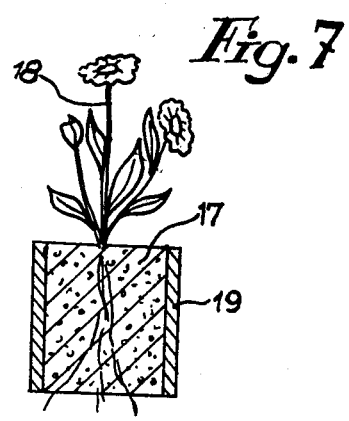
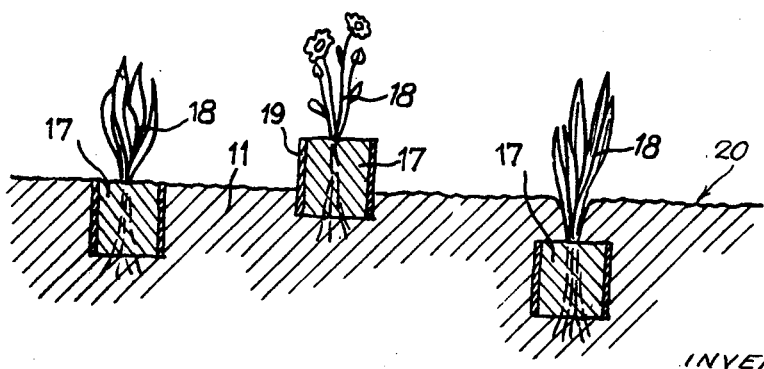

United States Patent Office 3,154,884
Patented Nov. 3, 1964

3,154,884
DEVICE FOR FACILITATING SOWING AND PROTECTING PLANTS REARED FROM THE SEEDS
Sion Segre Amar and Guido Sasso, both of
111 Via Torino, Nichelino, Turin, Italy
Filed Aug. 8, 1961, Ser. No. 130,096
Claims priority, application Italy, Aug. 12, 1960, 636,863;
Oct. 1, 1960, 17,211/60; Dec. 22, 1960, 22,308/60;
May 5, 1961, 8,691/61
2 Claims. (Cl. 47—1)

This invention relates to a means for facilitating sowing of vegetable seeds and protecting plants reared from said seeds.

The device comprises a carrier adapted to incorporate the seeds in a predetermined arrangement if desired, and to be placed on the surface on which said plants should be cultivated.

The improved device affords in addition to accurate sowing by a predetermined mutual arrangement of the seeds a more efficient protection of the plants than was possible heretofore by placing on the soil sheets of plastic between rows of seeds individually sunk into the ground.

With the improved device protection against weeds extends to the proximity of the seeds where such protection is mostly needed.

Moreover, the device prevents evaporation from the ground in nearest proximity to the seeds incorporated by the carrier thereby promoting germination of the seeds.

The improved carrier is preferably manufactured in the form of a web mat from which sections matching the length of the soil to be sown are cut and arranged adjacent therebetween.

The carrier can be secured to the soil by ridging, that is, accumulating earth on the carrier edges, or by setting the lateral carrier edges into the soil during laying.

In order to facilitate setting said edges can be bent over on manufacture of the web, or the latter may be formed with score lines to facilitate bending of the edges in use.

Alternatively the support can be formed with thickened or otherwise reinforced zones for driving therethrough nails or similar means for anchorage to the soil, or the rivets, which may be made of plastic, can be provided in a spaced relationship on the carrier on manufacture.

The improved device can be carried out, by way of example, as follows:

(A) The carrier is in the form of a mat, preferably a web, such as of plastic, formed with spaced recesses or through bores in each of which a seed in attached by means of a suitable adhesive;

(B) The carrier comprises a pair of mats, such as of plastic enclosing therebetween the seeds in spaced relationship, said mats being bonded together such as by welding, gluing or the like of the gaps between the seeds;

(C) One at least of the two mats according to paragraph (B) has recesses or through bores at the zones adapted to receive the seeds;

(D) One of the mats according to paragraph (B) has recesses or through bores at the zones adapted to receive the seeds, the other mat being made of a spongy or moisture-absorbing material;

(E) One at least of the mats according to paragraph (B) is formed before bonding to the other mat with seats, or with bores if desired, the seeds being slid to said seats such as by vibration;

(F) One at least of the mats according to Example (B) is made of a material capable of swelling in the presence of moisture to promote issue of the seedling from each seed. This material may be a polyvinyl alcohol base resin;

(G) The support is in the form of a spongy mat, preferably a web incorporating the seeds;

(H) A covering sheet, such as of cellophane or plastic is attached to the top of the carrier for removal after germination.

The latter embodiment is more particularly suitable for minute seeding when a pure growth free from any weed is desired.

(I) The carrier is made of moisture-absorbing material;

(J) The carrier incorporates growth-promoting stuffs, such as fertilizers, germination and growth activators or inhibitors, disinfectants, pesticides and the like;

(K) The carrier can be colorless or colored to suit requirements of the culture.

Depending upon the type of plant the seeds can be incorporated by the carrier in a predetermined mutual relationship or at random.

In the former case the seeds can be arranged in one or more parallel rows according to the size of the carrier web.

The improved device is suitable also for rearing hydrophytes, when water and nutriment are contained in a container having non-porous walls instead of being supplied by the soil. The carrier incorporating the seed which then be made of plastic, is placed into a container or basin filled with water to which nutritious substances may be added.

According to an embodiment of this invention the carrier to be placed into the container is a mat of spongy material onto which the seeds are attached by means of a suitable adhesive or a top mat of moisture-absorbing material.

According to a further embodiment the seed carrier is placed into a container filled with water.

Under a further aspect of this invention the seed carrier is made from synthetic or natural material, from which mats or blocks can be obtained, of sufficient hygroscopicity to promote germination of the seed and growth of the seedling. Of course, in addition to seeds, nutritious substances, pesticides, stimulants or inhibitors can be incorporated by the carrier on or after manufacture.

The improved device can be employed for cultivating vegetables requiring transplantation, when the carrier is conveniently in the form of blocks, each incorporating one or more seeds. This affords considerable advantages over transplanting either by hand or mechanically as presently in use.

As compared with manual transplantation the invention affords inter alia the advantage of grouping a considerable number of individual plants within a reduced space during the stage or stages preceding settling in the soil and avoiding injury to either the root or aerial part of the plants during transport to their settling place.

As compared with mechanical transplantation a further advantage derives from the constant shape and consistency of the carrier. A fully mechanical transplantation is thereby made possible, any manual intervention being dispensed with even for feeding the machine.

Tests disclosed that the device can advantageously be of the two-layer type, comprising a first layer of spongy material acting as a support for the roots after germination, and a further layer comprising an adhesive and a substance promoting germination, glued to the first layer, said second layer incorporating the seeds. The first-mentioned layer is conveniently adapted to act as a selective filter passing the roots and retaining weeds. Accordingly, the first mentioned layer can be made of expanded plastic in sheet form of a few millimeter (1 to 5 mm.) gauge. When transplantation is required, blocks of said material having a continuous lateral wall which is not or hardly penetrable by the roots are employed.

The germination promoting substance in the second-mentioned layer is conveniently in powder or granulated form and comprises cellulose or cellulose derivatives. This material is mixed with the adhesive and seeds to a paste which is spread on the underlying spongy carrier layer and sticks to the latter by action of the adhesive.

The adhesive substance shall be such as not to inhibit, but rather promote germination of the seeds. Under this aspect it was found that, for instance, hydroxymethylcellulose can be employed.

The second-mentioned layer shall in practice be placed on the carrier either on manufacture or subsequently thereto, just before use. The second layer material can be packed in containers and spread on the carrier when desired. This procedure is advantageous in that it is inexpensive, affords efficient protection against weeds and further promotes germination.

Further characteristic features of this invention will be understood from the appended description referring to the accompanying drawing showing some embodiments thereof, wherein:

FIGURE 1 is a sectional view of a grass culture according to this invention;

FIGURE 2 is a detail view on an enlarged scale of the culture according to FIGURE 1 at its initial stage;

FIGURE 3 shows a modification of FIGURE 1;

FIGURE 4 shows a further modification of FIGURE 1 and

FIGURE 5 shows a third modification of the culture shown in FIGURE 1;

FIGURE 6 is a perspective view of a container for a plurality of blocks containing individual plants, suitable for use in feeding the transplanting machine, FIGURE 7 shows a block according to a modification of FIGURE 6, FIGURE 8 shows the arrangement of blocks settled in the soil.

In the embodiment shown in FIGURES 1 and 2, a carrier 1 of spongy plastic or other material mentioned above has arranged on one face seeds 2 retained by a layer of adhesive 3.

The carrier is placed into a container 4 having a lateral wall 4a which can slightly exceed the carrier in height. The carrier 1 is initially saturated with water by irrigation. The bottom and the walls of the container can be provided with ribs or recesses defining channels crossing therebetween and facilitating the water distribution inside the carrier 1.

Germination of seeds 2 rears seedlings 5, lawn-grass (*Agrostis tenuis*) in the example shown.

Subsequently to germination, similarly to the cultivation of hydrophytes nutritious substances are admixed to the water which is periodically introduced into the container 4.

In addition to acting as an initial support for the seeds the carrier 1 acts as a support for the plant roots after germination and during growth.

In the embodiment shown in FIGURE 3 a section of the cellular carrier has been removed and replaced by an insert 6 of similar material carrying a culture other than indicated by 5. The insert can carry seeds for a flower-bearing plant 7.

According to the embodiment shown in FIGURE 4 an insert 6 is enclosed by a container 8 segregating it from the surrounding material 1 to prevent the roots of plant 7 from trespassing upon the surrounding lawn-grass 5.

The embodiments shown in FIGURE 3, more especially in FIGURE 4 afford the possibility of periodically renewing flower-bearing plants 7 during the various periods without altering the lawn-grass 5.

The embodiment shown in FIGURE 5, which is more particularly suitable for use on balconies, terraces or gardens, includes a carrier of spongy consistency 1 placed on a bed 9 of sand or other inert material arranged in turn on the bottom of a container 4. The thickness of the foam material 1, hence the cost of the device is thereby reduced.

The improved device is more particularly suitable for cultivating lawn-grass within containers of material such as plastic, which can easily be arranged indoors or combined with plots in gardens, whether there is soil underneath or not.

For out-of-door use the container can be cast with a peripheral edge from cement into the soil, instead of being of the portable type.

In order to enhance the flower-bearing cultivations amid the lawn-grass the spongy inserts containing them can be supported by pedestals resting on the bottom of the container 4.

The embodiment shown in FIGURE 6 provides a container having a bottom 11, side walls 12 and 13, and end walls 14, 15. The end walls 14, 15 are tiltable to the outside. The container encloses a separator 16 subdividing it into cases, each accommodating a block 17 incorporating one or more seeds.

Water or another suitable solution is poured into the container, seedlings 18 being reared from the seeds. When the plants have grown enough for transplanting, the container is brought to the transplanting machine, the separator 16 is removed, walls 14 and 15 being tilted outwardly.

The container then acts as a magazine for loading the blocks carrying the plants between the movable members of the transplanting machine. Suitable tools well known to any expert individually discharge the blocks 17.

FIGURE 7 shows a block 17 having a continuous side wall which is not or hardly penetratable by the roots. This dispenses with the use of a separator 16 by preventing the roots from trespassing upon adjacent blocks.

FIGURE 8 shows three blocks 17 carrying plants 18 settled in a soil 20 at varying depths according to the type of culture.

We wish it to be understood that the shape of the containers and blocks and constructional details of the latter can be varied without departing from the scope of this invention.

The best practical results are obtained with sheets made of spongy cellulose having very small and uniformly distributed alveolae so as to render the sponge homogeneous.

Such sheets could have a stamped checkered surface pattern to facilitate counting of seeds glued, or not, onto the said surface. The sheets could also be provided with cavities opened to the surface and having a size chosen to suit the quality of seeds.

It has also been proven that the seeds germinate best when put between two sheets of spongy cellulose of equal or different thicknesses.

These germinating and growing properties are to be attributed to an affinity of characteristics of the sheet material and of the seed tegument, to the high water absorbing and retaining capacity of the spongy material (approx. 20 times its own weight) combined with a capacity to yield water to the immediate surrounding due to the low capillarity factor of the sheet material and, at the same time to the ability of keeping in close proximity to the seed of a certain quantity of air; with the combined results of protecting the seed either against drought or against the damaging effect of an excess of moisture. Moreover, the cellulose sponge affords good mechanical properties of elasticity and strength.

A particularly suitable foamed cellulose is regenerated cellulose sponge.

In an alternative use the cellulose sponge sheets can be used in growing potted plants. The sheet in a form of a circle having a central hole is placed on a pot containing earth and a centrally placed seed so as to cover the whole earth surface leaving only the central portion uncovered thus allowing the growth of the seed. In order to prevent eventual shrinkage, of the sponge circle, it may be circumferentially secured to an expansion split ring biasing against inner surface of the pot, thereby keeping the sheet extended.

As a further alternative, the circle can also be radially split to allow for covering the earth around an already growing plant.

When used for growing potted plants, the wetted cellulose sponge sheet acts as a dosing device yielding moderately the moisture into earth, and at the same time it prevents evaporation and weeds growing.

What we claim is:

1. As a new product of manufacture a seed carrier composed of a sheet of regenerated cellulosic sponge adapted to be laid over the soil and having seeds adhesively adhered to the surface thereof in predetermined spaced positions, said cellulosic sponge being capable of absorbing water and swelling in the presence of moisture and of disintegrating at a slow rate to permit the roots from the germinated seeds to enter the soil over which the sheet is laid, said sheet carrying inserts composed of the same material as the sheet, said inserts having adhered thereto seeds of a kind different from those carried by said sheet.

2. A product as set forth in claim 1 in which said inserts are segregated from said sponge sheet by plastic walls.

References Cited in the file of this patent

UNITED STATES PATENTS

| | | |
|---|---|---|
| 313,424 | Hughes | Mar. 3, 1885 |
| 526,512 | Weber | Sept. 25, 1894 |
| 614,002 | Jenkins | Nov. 8, 1898 |
| 1,276,887 | Eckart | Aug. 27, 1918 |
| 1,931,248 | Bryant | Oct. 17, 1933 |
| 1,971,504 | Pratt | Aug. 28, 1934 |
| 2,143,468 | Avery | Jan. 10, 1939 |
| 2,264,973 | Guarino | Dec. 2, 1941 |
| 2,570,537 | Finch | Oct. 9, 1951 |
| 2,648,165 | Nestor | Aug. 11, 1953 |
| 2,769,734 | Bandel | Nov. 6, 1956 |
| 2,785,969 | Clawson | Mar. 19, 1957 |
| 2,965,584 | Elkin | Dec. 20, 1960 |
| 2,971,290 | Kyle | Feb. 14, 1961 |
| 2,988,441 | Pruitt | June 13, 1961 |

FOREIGN PATENTS

| | | |
|---|---|---|
| 1,087,158 | France | Aug. 18, 1954 |
| 1,179,791 | France | Dec. 22, 1958 |
| 13,471 | Great Britain | of 1910 |
| 116,947 | Great Britain | July 4, 1918 |
| 641,280 | Great Britain | Aug. 9, 1950 |
| 699,028 | Great Britain | Oct. 28, 1953 |

OTHER REFERENCES

Condensed Chemical Dictionary, fifth edition, N.Y., Reinhold, 1956; pages 3, 37, 1159.

New York Times (Newspaper), Sunday, May 5, 1957, Sec. 2, page X–22, advertisement of "COV-R-GRO" Plastic Garden Mulch.